United States Patent [19]

Yates et al.

[11] Patent Number: 5,457,912
[45] Date of Patent: Oct. 17, 1995

[54] FRAMELESS SIDE GLASS ADJUSTMENT

[75] Inventors: Christopher J. E. Yates, Stratford-On-Avon; Richard C. Warwick, Potters Green; Michael O. Larner, Horeston Grange, all of United Kingdom

[73] Assignee: Jaguar Cars Limited, United Kingdom

[21] Appl. No.: 276,513

[22] Filed: Jul. 15, 1994

[30] Foreign Application Priority Data

Sep. 30, 1993 [GB] United Kingdom ............... 9320134

[51] Int. Cl.$^6$ .................................................. B60J 5/04
[52] U.S. Cl. .................................................. 49/374
[58] Field of Search .......................... 49/374, 375, 376, 49/377, 502, 468, 348–352, 482.1; 296/146.2, 146.3; 403/47, 297, 44

[56] References Cited

U.S. PATENT DOCUMENTS

| | | | |
|---|---|---|---|
| 830,110 | 9/1906 | Spencer | 403/44 |
| 3,844,064 | 10/1974 | Yamaha et al. | 49/375 X |
| 4,089,134 | 5/1978 | Koike | 49/374 X |
| 4,484,831 | 11/1984 | Hanson, Jr. et al. | 403/47 X |
| 4,761,915 | 8/1988 | Marz . | |

FOREIGN PATENT DOCUMENTS

8621577 U 8/1986 Germany .

Primary Examiner—Philip C. Kannan
Attorney, Agent, or Firm—Davis, Bujold & Streck

[57] ABSTRACT

An adjuster for the inboard\outboard adjustment of a frameless side glass has a first block secured to a guide for the side glass adjacent the lower end thereof and a second block secured to a support panel. The first and second blocks have threaded apertures, the apertures being located coaxially of one another, the thread of one aperture being of opposite hand to the thread of the other aperture. A spindle has threaded portions one at each end, the threaded portions corresponding to and engaging the threaded apertures of the blocks and a hexagonal socket being provided in the end of the spindle by which the spindle may be rotated to move the blocks together or apart, thereby moving the lower end of the inboard or outboard relative to the support panel.

7 Claims, 1 Drawing Sheet

FRAMELESS SIDE GLASS ADJUSTMENT

BACKGROUND TO THE INVENTION

The present invention relates to the adjustment of frameless side glasses in motor vehicles and in particular to an adjuster for providing inboard/outboard adjustment of frameless side glasses.

Frameless side glasses for vehicle doors are typically located by two or more guides which are located between the inner and outer skins of the door. There is a requirement to adjust glass after fitting to the door, in order to ensure that the glass sealingly engages the body work or hood material of the vehicle to produce a water tight seal therewith.

SUMMARY OF THE INVENTION

According to one aspect of the present invention, an adjustor for the inboard/outboard adjustment of a frameless side glass comprises a first block adapted to be mounted with respect to a guide for the side glass adjacent the lower end thereof and a second block adapted to be mounted with respect a support panel, the first and second blocks having apertures which are adapted to be located coaxially of one another when the blocks are mounted with respect to the guide and support panel respectively, said apertures having screw threads, the screw thread on the first block being of the opposite hand to that on the second block, a spindle having threads one at each end, corresponding to the threads of the first and second blocks, said threads on the spindle engaging the corresponding threads on the first and second blocks and means being provided for rotation of the spindle.

With the adjustor described above, the bottom end of the guide is located with respect to the support panel by means of the spindle. The upper end of the guide will be mounted with respect to a support member in a manner which will permit limited pivotal movement of the guide. The guide may then be adjusted by rotating the spindle so that the blocks are moved together or apart.

The means for rotating the spindle is preferably a slot or socket in the end of the spindle, which may be engaged by a screwdriver, Allen key or the like. The spindle is preferably located in the blocks so that it is transverse to the plane of the side glass to provide inboard/outboard adjustment.

According to a preferred embodiment of the invention, the blocks are made a reinforced plastics material, for example glass reinforced nylon, which will provide tight engagement with the threads on the spindle. The spindle may be made of a corrosion resistant material, for example stainless steel.

BRIEF DESCRIPTION OF THE DRAWINGS

An embodiment of the invention is now described, by way of example only, with reference to the accompanying drawings, in which.

DESCRIPTION OF A PREFERRED EMBODIMENT

Figure 1:
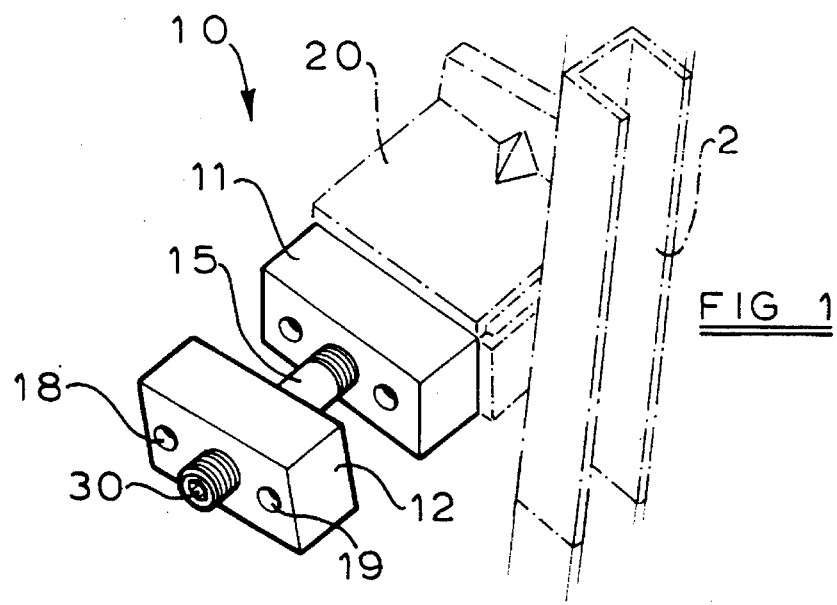
FIG. 1 illustrates in isometric view, an adjustor in accordance with the present invention.
Figure 2:
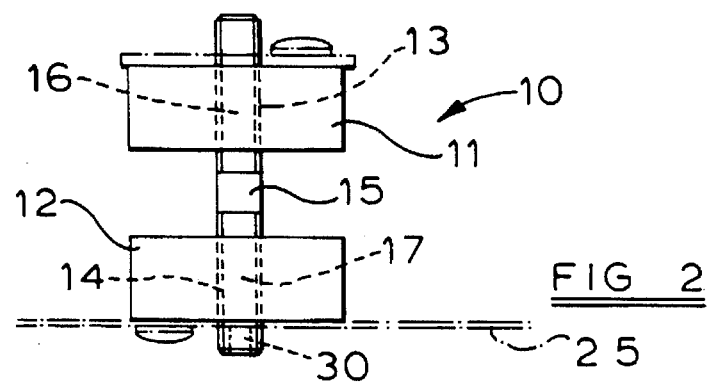
FIG. 2 is a plan view of the adjustor illustrated in FIG. 1.
Figure 3:
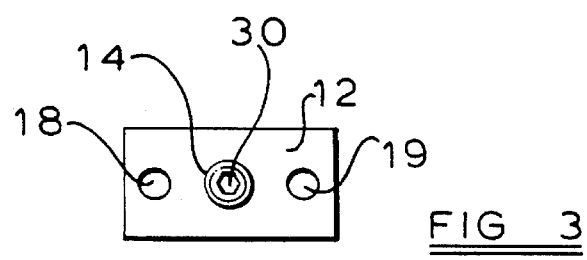
FIG. 3 is a front elevation of the adjustor illustrated in FIG. 1.

As illustrated in the accompanying drawings an adjustor 10 for inboard/outboard adjustment of a frameless side glass for the door of a motor vehicle comprises a pair of blocks 11, 12 formed from 30% glass reinforced nylon. The blocks 11, 12 are provided with screw threaded apertures 13 and 14 respectively, the screw threaded aperture 13 in block 11 being of opposite hand to the screw threaded aperture 14 in block 12. A stainless steel spindle 15 has threaded portions 16, 17 one at each end, the threaded portion 16 corresponding to the threaded aperture 13 of block 11 and the threaded portion 17 corresponding to threaded aperture 14 of block 12.

Blocks 11, 12 are provided with further apertures 18, 19 by means of which the blocks 11, 12 may be secured to associated components by means of suitable fastening means, for example screws, bolts or rivets.

Block 11 is secured to a bracket 20 which is mounted adjacent the lower end of a guide channel 21 for the side glass. The block 11 is secured to the bracket 20 so the axis of the threaded aperture 13 is transverse to the guide channel 21. The upper end of the channel 21 is secured to a support member adjacent the upper edge of the door, in a manner which will permit limited inboard/ outboard pivotal movement of the channel 21.

Block 12 is secured to the door inner panel 25, so that the threaded aperture 14 is coaxial with threaded aperture 13 of block 11. The spindle 15 is screwed into blocks 11 and 12, threaded portion 16 engaging threaded aperture 13 and threaded portion 17 engaging threaded aperture 14. A hexagonal socket 30 is provided in the end of the spindle 15 that engages block 12, so that an Allen key may be engaged in the socket 30 to rotate the spindle 15 and move block 11 towards or away from block 12. Movement of the block 11 towards block 12 will move the lower end of the guide channel 21 inboard and hence provide outboard adjustment of the side glass extending from the upper edge of the door while movement of block 11 away from block 12 will move the channel 21 outboard, providing inboard adjustment of the side glass.

Adjusters as described above will be provided adjacent the lower ends of each of the guide members locating the side glass, so that by appropriate adjustment of the lower end of the each of the guide members, the plane of the glass in its raised position may be adjusted so that the side glass will engage the bodywork/hood material of the vehicle to provide a watertight seal therewith.

The present invention provides a rattle free adjustment mechanism for inboard/outboard adjustment of the side glass, particularly when tight threaded engagement is achieved by, for example the use of reinforced plastics materials. The use of opposite handed screw threads also acts to lock the spindle so that once adjusted, the spindle will not be rotated by vibration.

Various modifications may be made without departing from the invention. For example, while it is preferred to use reinforced plastics materials which will provide tight threaded engagement, other materials may be used for the blocks, provided that the threads on the spindle tightly engage those on the blocks. Also, other means of fastening the blocks to the brackets and/or supporting panel may be used, for example grooves in the blocks may engage in keyhole slots in the support panel and bracket to provide transverse and rotational location.

We claim:

1. An adjuster for the inboard/outboard adjustment of a frameless side glass comprising a first block adapted to be mounted with respect to a guide for the side glass adjacent the lower end thereof and a second block adapted to be mounted with respect to a support panel, the first and second blocks having apertures which are adapted to be located coaxially of one another when the blocks made of reinforced plastics material, said blocks are mounted with respect to the guide and support panel respectively, said apertures having screw threads, the screw thread on the first block being of the opposite hand to that on the second block, a spindle having threads one at each end, corresponding to the threads on the first and second blocks, said threads on the spindle engaging the corresponding threads on the first and second blocks and means being provided for rotation of the spindle.

2. An adjuster according to claim 1 in which the means for rotating the spindle is a slot or socket which is provided in the end of the spindle for engagement by a screwdriver, Allen key or the like.

3. An adjuster according to claim 1 in which the first and second blocks are made of glass reinforced nylon.

4. An adjuster according to claim 1 in which the spindle is made of a corrosion resistant material.

5. An adjuster according to claim 4 in which the spindle is made of stainless steel.

6. An adjuster according to claim 1 in which means is provided for attachment of the first and second blocks to the guide and support panel respectively.

7. An adjuster according to claim 6 in which apertures are provided in the first and second blocks for engagement of fastening means.

* * * * *